United States Patent [19]

Snyder

[11] Patent Number: 4,728,343

[45] Date of Patent: Mar. 1, 1988

[54] ABSORPTION OF HYDROCARBON VAPORS BY VULCANIZED RUBBER

[75] Inventor: Robert H. Snyder, Grosse Pointe Park, Mich.

[73] Assignee: The Uniroyal Goodrich Tire Company, Akron, Ohio

[21] Appl. No.: 884,580

[22] Filed: Jul. 11, 1986

[51] Int. Cl.4 .............................................. B01D 53/04
[52] U.S. Cl. ............................................ 55/59; 55/74
[58] Field of Search ....................... 55/74, 387, 59, 62; 210/680

[56] References Cited

U.S. PATENT DOCUMENTS

| | | | |
|---|---|---|---|
| 3,305,656 | 2/1967 | Devins | 55/75 X |
| 3,494,862 | 2/1970 | Horowitz | 210/40 |
| 3,503,774 | 3/1970 | Weymouth | 117/6 |
| 3,518,183 | 6/1970 | Evans | 210/40 |
| 3,567,660 | 3/1971 | Winkler | 210/680 X |
| 3,629,998 | 12/1971 | Takehisa | 55/71 |
| 3,686,827 | 8/1972 | Haigh et al. | 55/74 |
| 3,727,379 | 4/1973 | Bijleveld et al. | 55/74 X |
| 3,798,876 | 3/1974 | Kennedy | 55/59 |
| 3,804,943 | 4/1974 | Block | 423/245 |
| 3,805,493 | 4/1974 | Kennedy et al. | 55/74 |
| 4,344,775 | 8/1982 | Klein | 55/75 |
| 4,466,813 | 8/1984 | Avritt et al. | 55/74 |
| 4,519,816 | 5/1985 | Clarke | 55/74 X |
| 4,531,950 | 7/1985 | Burt | 55/74 X |

FOREIGN PATENT DOCUMENTS

| | | | |
|---|---|---|---|
| 625216 | 8/1961 | Canada | 55/74 |
| 3005666 | 8/1981 | Fed. Rep. of Germany | 55/74 |
| 91091 | 12/1972 | Japan | 55/74 |
| 122493 | 11/1974 | Japan | 55/74 |
| 712113 | 1/1980 | U.S.S.R. | 55/74 |
| WO82/02342 | 7/1982 | PCT Int'l Appl. | 55/74 |

*Primary Examiner*—Robert Spitzer
*Attorney, Agent, or Firm*—John D. Haney; Alfred D. Lobo

[57] ABSTRACT

The present invention relates to a method of substantially precluding the accumulation of combustible organic vapors in a storage container by placing comminuted vulcanized rubber as an absorbing medium in contact with the vapors.

9 Claims, No Drawings

ABSORPTION OF HYDROCARBON VAPORS BY VULCANIZED RUBBER

BACKGROUND OF THE INVENTION

1. Field of the Invention

The present invention relates to a method of substantially precluding the accumulation of combustible organic vapors in a storage container.

2. Description of the Prior Art

When volatile organic materials are maintained in a confined storage container, a hazardous situation exists if the concentration of the combustible organic vapor in the air in the storage container falls within the explosive envelope or range. By the term "explosive envelope" is meant the vapor/air ratio range that will support combustion. The vapors will not explode if the atmosphere in the storage container is overrich, which means that there is an excess of vapors and, consequently, there is insufficient air to support combustion, i.e., the vapor/air ratio is above the upper limit of the explosive envelope. The vapors also will not explode if the atmosphere in the storage container is too lean which means there is not enough vapor to support combustion, i.e., the vapor/air ratio is below the lower limit of the explosive envelope.

Petroleum tankers carry crude oil as it is extracted from the ground and such crude oil normally contains considerable quantities of volatile hydrocarbons. There is no safety problem when the storage tanks of the petroleum tankers are completely filled or "topped off" with crude oil, since it is not the oil itself that is highly combustible or explosive under these conditions but rather the hydrocarbon vapors given off therefrom.

A measure of the flammability of combustible vapors is the "flash point" which is defined as the lowest temperature at which enough vapors are given off to form a flammable mixture of vapors and air immediately above the liquid surface. The flash points of various solvents differ widely. Flash points are affected by temperature, barometric pressure and molecular structure. Hydrocarbon vapors have low flash points and burn or explode at temperature as low as $-40°$ F.

After a tanker has discharged its crude oil cargo, pools of thick crude oil residue often remain in the bottom of the tanks out of reach of the main discharge pumps and the walls of the holding tanks are oftimes covered by a thin layer of an oil-wax mixture. The residue of crude oil in the hold of the ship desorbs the volatile hydrocarbons into the empty tank chamber and an explosive mixture of vapor and air may result which can be ignited by a spark. To prevent this danger, tanker crews generally scrub down the walls of the container in the ship and manually remove the residue therefrom. The crude residue from the tanks is normally discarded overboard and for many years constituted a major source of pollution at or near the harbors where such cargoes are discharged. Manual removal of the oil dregs is also a very expensive procedure.

A convenient way of eliminating the hazardous condition and environmental pollution inherent in the existing practice is to control the atmosphere inside the tank so as to ensure that the vapor/air mixture remains outside of the explosive envelope even in the presence of residual crude oil.

SUMMARY OF THE INVENTION

To avoid the difficulties described above, a combustion preventing amount of vulcanized rubber material is placed in contact with the organic compound vapors which exist above the liquid phase of said organic compound inside a container whereupon said organic compound vapors are absorbed by said vulcanized rubber in a sufficient amount to result in an atmosphere within the container which is non-explosive. The organic substance absorbed by the rubber material in the container is subsequently desorbed using any convenient method. Alternatively, the swollen rubber compound may be used as fuel, or as supplementary fuel in a steam boiler.

DESCRIPTION OF THE INVENTION

In accordance with the method of the present invention, an effective combustion preventing amount of vulcanized rubber material is placed inside a storage container which contains a volatile organic liquid and the vapors emanating therefrom or in equilibrium therewith.

The vulcanized rubber comprises either a non-black rubber, such as, for example, buffings of white sidewall stock, comminuted rubber bands, fragmented vulcanized gum rubber, or vulcanized rubber reinforced with carbon black, such as vulcanized black rubber buffings, tread raspings (such as airplane tread raspings), and similar vulcanized carbon black reinforced rubber particles. Frequently, the vulcanized rubber particles employed are made up of about 20-80% by weight of non-black stock and correspondingly about 80-20% of black stock.

Such vulcanized rubber materials are readily available as processing scrap, particularly from the tire industry, and for purposes of the invention, it is a matter of indifference whether the stocks be based on natural rubber, or on any of the synthetic rubbers used in the tire industry, for example, SBR, butyl rubber, or polychloroprene or mixtures thereof. Conventional white sidewall stocks and tread stocks are also suitable.

Scrap tires are preferably used in the instant invention and, as noted above, are the standard rubber tires composed of vulcanizable materials (i.e., rubbers capable of crosslinking) which are compounded and vulcanized in accordance with the standard procedures found in the prior art. The vulcanizable materials are any of the unsaturated hydrocarbon polymers exemplified by the diene polymers (which may be halogenated), such as polybutadiene, polychloroprene or polyisoprene, especially polybutadiene or polyisoprene having a high content of cis-polymer or a low content of cis-polymer; copolymer rubbers such as SBR (copolymer of styrene and butadiene), butyl rubber (copolymers based on isomonoolefins such as isobutylene and a small amount, e.g., 0.25 to 10% of a conjugated diene such as isoprene), and even natural polymers such as guayule rubber, Hevea rubber and the like. Also depolymerized rubber may be used. Other unsaturated hydrocarbon polymers that may be mentioned are the rubbery interpolymers of at least two alpha-monoolefins (e.g., ethylene, propylene, butene-1, hexene-1, 4-methylpentene-1, 5-methylhexene-1, 4-ethylhexene-1 or similar olefins having the formula $CH_2=CHR$, in which R is hydrogen or a hydrogen radical, particularly a saturated alkyl hydrocarbon radical having from 1 to 8 carbon atoms) and at least one copolymerizable diene such as dicyclopentadiene, methylcyclopentadiene dimer, 1,4-hexadiene, 11-ethyl-1, 11-tridecadiene, 1,9-octadecadiene, 1,5-cyclooctadiene, methylene norbornene, ethylidene norbornene or other suitable dienes (such rubbers are sometimes referred to as "EPDM") such as are disclosed in British Pat. No. 880,904 or Dunlop Rubber Co., Oct. 25, 1961, U.S. Pat. Nos. 2,933,480, Gresham and Hunt, Aug. 19, 1960, and 3,000,866 Tarney, Sept. 19, 1961 and Belgian Pat. Nos. 623,698 and 623,741 of Montecatini, Feb. 14, 1963; preferred are terpolymers of this kind containing from about 1 to about 25% (more preferably about 2 to about 15%) by weight of dicyclopentadiene or the like. The invention can be practiced with rubbers prepared by methods other than solution polymerization, such as, for example, by emulsion polymerization. Typical of such rubbers are emulsion polymerized diene homopolymers or copolymers including butadiene-styrene copolymer or copolymers with other copolymerizable monomers such as acrylonitrile, vinylpyridine, ethyl acrylate and the like.

The amount of scrap rubber to be used inside the storage container is dependent upon the amount of volatile organic vapors in the storage container and should be an amount sufficient to prevent combustion, i.e., to reduce the organic material in the atmosphere to a level below the explosive envelope. Obviously, this amount will vary from case to case, however, determination of the amount is not beyond the expertise of one skilled in the art and does not involve undue experimentation to ascertain same.

The present invention can also be used in conjunction with the storage of such solvents as acetaldehyde, carbon disulfide, diethyl ether, dimethyl ether, ethyl chloride, gasoline, isobutyraldehyde, methyl ethyl ether, petroleum ether, benzene and fuel oils and other flammable liquids.

Since the rate of absorption of the volatile organic vapors by the scrap rubber will depend in part upon the available surface area of the rubber, it is desirable to expose the maximum surface area of the vulcanized rubber to the organic vapor as possible. Accordingly, pursuant to the instant method, one may optionally use ground or otherwise comminuted scrap rubber packaged in porous containers such as mesh bags which are suspended in the atmosphere of the tank to be rendered non-combustible. The size of the comminuted vulcanized scrap rubber particles ranges from that just retained on about an 8 mesh screen to that just passing through about a 100 mesh screen. Typically, the particles will contain progressively varying sizes and fall within the range of from about 6 mesh to about 200 mesh with few, if any, particles appreciably larger or smaller than these extremes.

Alternatively, the scrap rubber may be adhered to sheets of fabric which are suspended in the tanks. This latter approach, when used, for example, on a petroleum tanker, would also produce convection currents in the crude oil containers by oscillating as the ship moves through the water. The vulcanized scrap rubber which is used pursuant to the present invention can be considered to be an extremely viscous liquid and, as such, can be expected to perform as a normal liquid with regard to vapor-liquid phase relations.

The scrap rubber which is placed inside a substantially empty crude oil tank on a ship absorbs from the ambient atmosphere the volatile hydrocarbon vapors that have been desorbed by the residue of the crude oil. The absorption of the vapors from volatile organic solvents in accordance with the method of the present invention insures that the vapor concentration in the air does not reach the dangerous level which could produce an explosion. Hence, in the case of a storage tanker, the need to remove the non-volatile crude oil residue is conveniently eliminated. This, in turn, obviates the pollution problem and substantial investment of time and effort presently attendant on discard of residue oil dregs.

Subsequently, the organic vapors which have been absorbed into the vulcanized rubber may be desorbed therefrom. One convenient method is to expose the rubber containing said organic material to a moving current of air. This may be simply achieved by allowing the container to be exposed to outdoor conditions which would permit desorption of the vapors to the atmosphere. Alternatively, the organic material can be desorbed under controlled conditions in a heated stream of air whereby the volatile materials are driven out of the rubber and subsequently entrained on activated charcoal or condensed in a condenser. Alternatively, if the rubber particles are finely ground, they may be ignored; they will then become dispersed in the next shipment of crude oil and will depolymerize under the conditions under which the crude oil is refined.

Although the instant invention has been described herein mainly in terms of precluding an accumulation of combustible hydrocarbon vapors in a petroleum storage tanker, such disclosure is by way of illustration only as the method is operational in any type of storage container found in oil refineries, bulk storage plants, solvent producing facilities, etc. The following examples are included to illustrate the practice of the invention in greater detail.

EXAMPLE 1

This example illustrates the imbibition of hydrocarbon vapor by vulcanized rubber.

A sample of tire-vent trimmings was placed in a nylon mesh bag. The bag and the trimmings were weighed and found to be 126.5 grams. The bag containing the vulcanized rubber trimmings was placed into a closed system under ambient conditions together with 10 milliliters of benzene. About 58 hours later it was noted that the container no longer held any benzene. The nylon bag and its contents were observed to weigh 134.6 grams: a weight gain of 8.1 grams. Another 10 milliliters of liquid benzene was added to the system which was then closed off. Approximately 48 hours later the liquid in the container had substantially disappeared. The sample now weighed 142.5 grams a weight gain of 7.9 grams over the last increment or a total weight gain of 16.0 grams or 12.6%. 10 milliliters of benzene was again added to the closed system. Approximately 24 hours later some liquid remained and the weight of the rubber and bag was 145.6 grams or 15% total absorption. Again 10 milliliters of benzene was added. Twenty-four hours later the container of rubber weighed 147.6 grams for a net weight gain of 21.1 grams or 16.7% total absorption. Approximately 96 hours later the benzene was no longer present in the system and the rubber sample weighed 154.8 grams, a weight gain of 22.3%. At this point, an additional 20 ml of benzene was added to the system. After twenty-four hours, the rubber sample weighed 157.0 grams, an increase of 24.1% and twenty-four hours thereafter the rubber weighed 158.5 grams, an increase of 25.3%. The up-take thereafter was very slow and for the purposes of this experiment, the absorption phase of same was finished.

This example clearly shows the absorptive capacity of scrap rubber with respect to hydrocarbon vapors.

What is claimed:

1. A method of substantially precluding accumulation of combustible hydrocarbon vapors in the air of a closed substantially empty holding tank comprising:
   placing an effective combustion preventing amount of vulcanized rubber particles in the size range from 6 mesh to 200 mesh in contact with said hydrocarbon vapors within said holding tank, and, absorbing said vapors emanating from residue in said tank whereby a sufficient amount of said vapors are absorbed into said vulcanized rubber particles to ensure that the hydrocarbon vapor/air ratio is below the explosive envelope.

2. The method described in claim 1 wherein said vulcanized rubber particles are comminuted scrap tires.

3. The method described in claim 1 wherein said closed holding tank is a storage tank in a petroleum tanker.

4. The method described in claim 1 wherein said vulcanized rubber particles are derived from rectangular strips.

5. A method of substantially precluding accumulation of combustible hydrocarbon vapors in the air of a closed substantially empty holding tank comprising:
   (a) placing an effective combustion preventing amount of vulcanized rubber particles in the size range from 6 mesh to 200 mesh in contact with said hydrocarbon vapors within said holding tank, and,
   (b) absorbing said vapors emanating from residue in said tank whereby a sufficient amount of said vapors are absorbed into said vulcanized rubber particles to ensure that the hydrocarbon vapor/air ratio is below the explosive envelope; and
   (c) removing said vulcanized rubber particles with the absorbed hydrocarbon vapors from said container.

6. A method of substantially precluding accumulation of combustible hydrocarbon vapors in the air of a closed substantially empty holding tank comprising:
   (a) placing an effective combustion preventing amount of vulcanized rubber particles in the size range from 6 mesh to 200 mesh in contact with said hydrocarbon vapors within said holding tank, and,
   (b) absorbing said vapors emanating from residue in said tank whereby a sufficient amount of said vapors are absorbed into said vulcanized rubber particles to ensure that the hydrocarbon vapor/air ratio is below the explosive envelope;
   (c) removing said vulcanized rubber particles with the absorbed hydrocarbon vapors from said container; and,
   (d) desorbing said hydrocarbon vapors from said vulcanized rubber particles.

7. The method described in claim 6 wherein said vapors are desorbed by contacting said vulcanized rubber with said absorbed vapors to a heated stream of air whereby said vapors are driven out of the vulcanized rubber.

8. The method described in claim 7 wherein said vapors are subsequently entrained on activated charcoal.

9. The method described in claim 7 wherein said vapors are subsequently condensed in a condenser.

* * * * *